Nov. 9, 1954  E. JACOBSEN ET AL  2,693,695
MASS CENTERING MACHINE
Filed Dec. 9, 1948  4 Sheets-Sheet 1
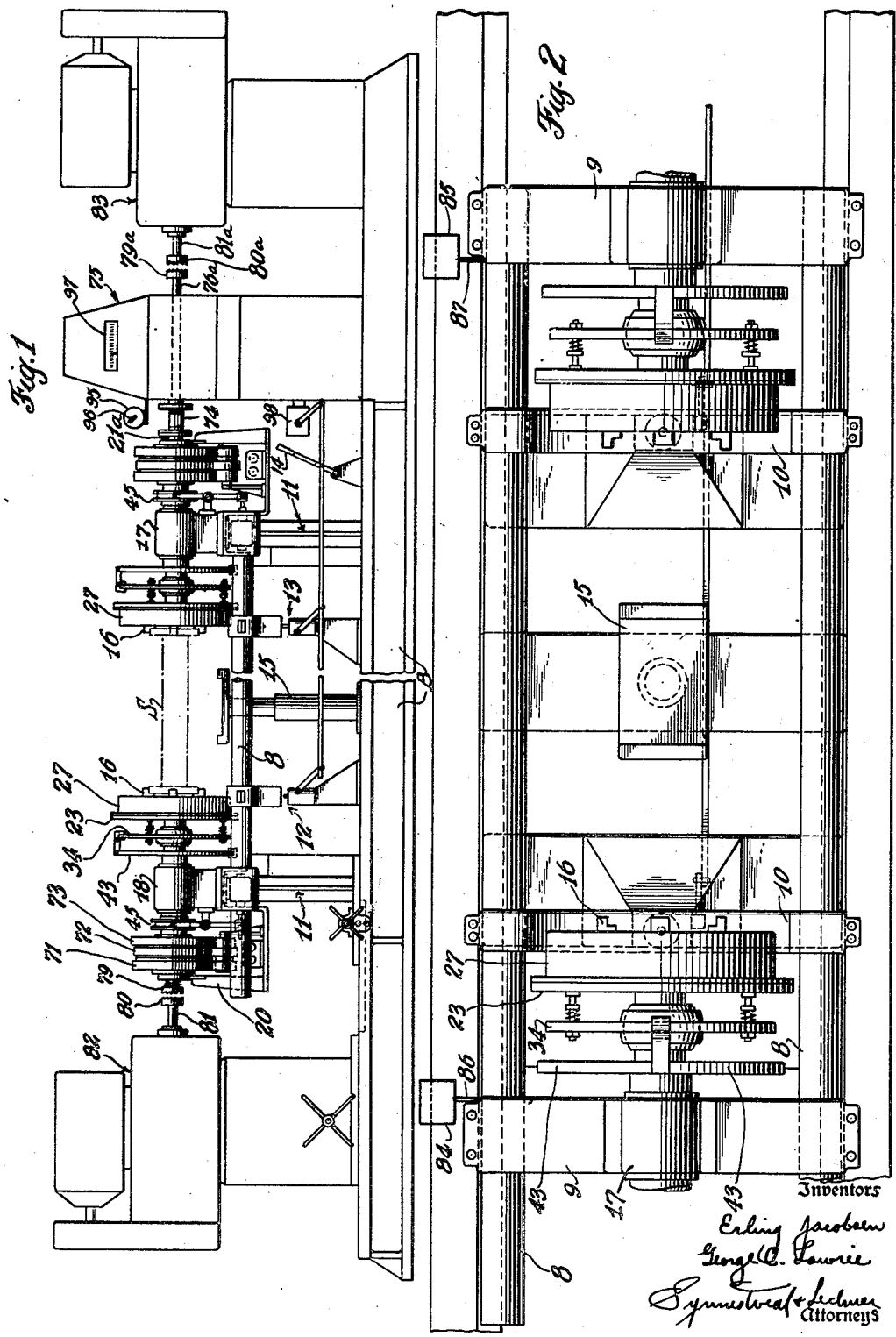
Inventors
Erling Jacobsen
George C. Lowrie
Synnestvedt & Lechner
Attorneys

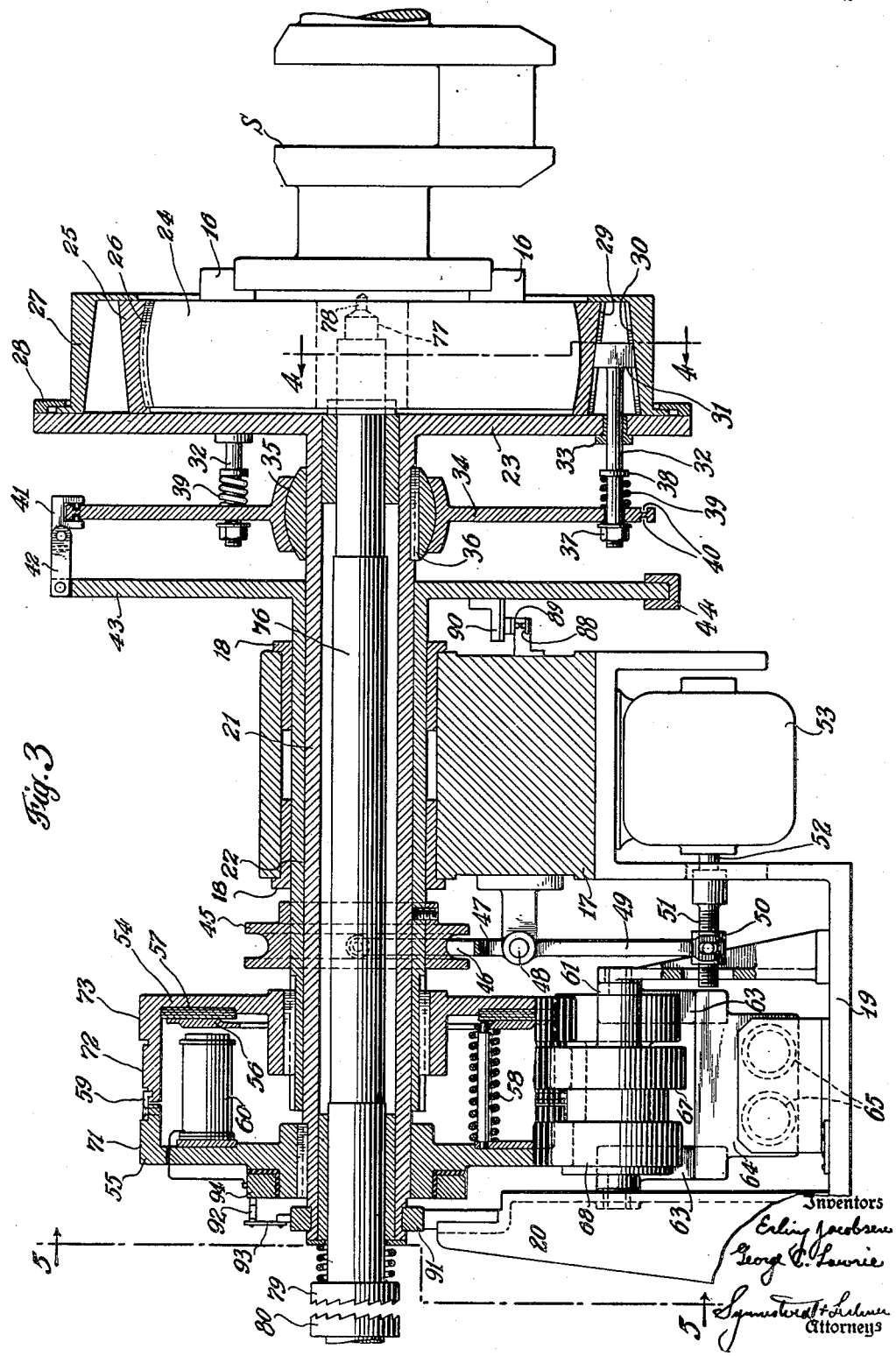

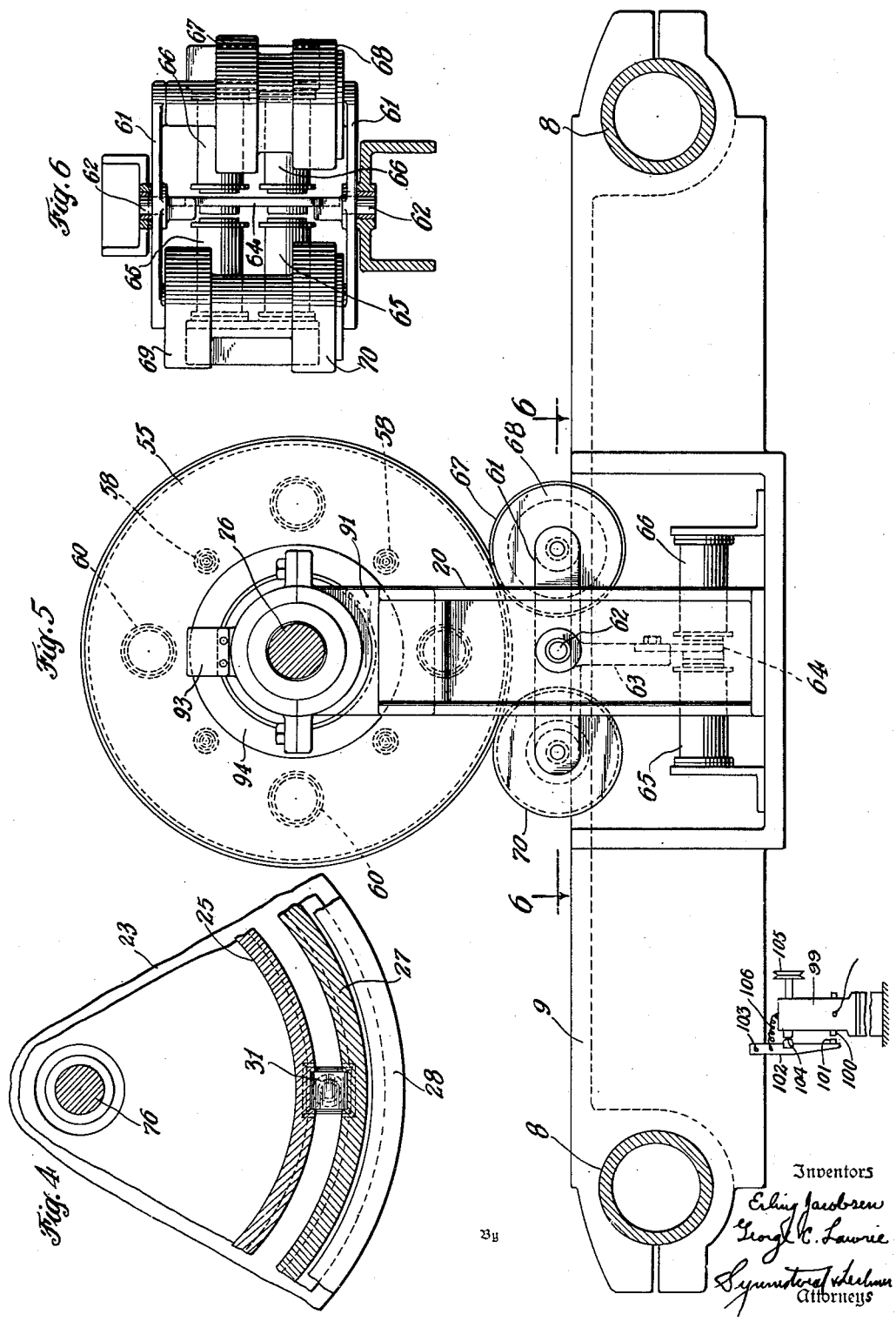

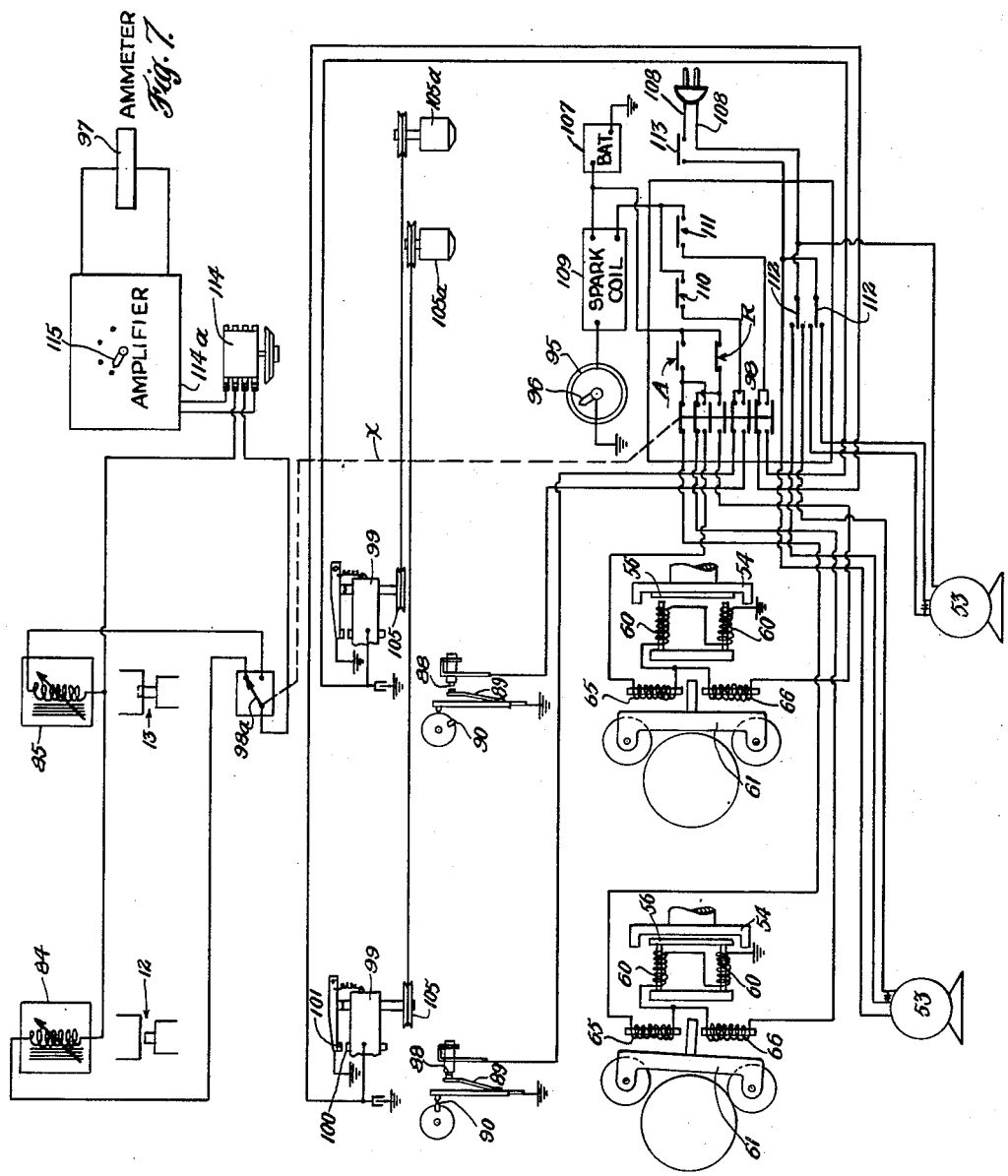

United States Patent Office 2,693,695
Patented Nov. 9, 1954

2,693,695

MASS CENTERING MACHINE

Erling Jacobsen, Drexel Hill, Pa., and George C. Lawrie, Collingswood, N. J., assignors to Tinius Olsen Testing Machine Company, Willow Grove, Pa., a corporation of Pennsylvania Application December 9, 1948, Serial No. 64,304

11 Claims. (Cl. 73—66)

This invention relates to balancing equipment or machinery, and is especially concerned with a mass centering machine, i. e., a machine of the type adapted to dynamically test a specimen, so as to locate and preferably also to mark the mass center thereof.

In equipment of this type a specimen to be tested, for instance an automobile engine crank shaft, is mounted upon an oscillatable cradle by means of supports, usually incorporating chucks adapted to engage the ends of the specimen. The specimen is then rotated and unbalance will be manifested by oscillation of the cradle. In equipment of this type it has been known to provide an adjustable mounting for each chuck or support, whereby the chuck may be controllably shifted in a direction transversely of the axis of rotation. Upon locating the position of the specimen giving rise to minimum oscillation of the cradle at each end, the mass center is found, and the specimen is then either marked or drilled to provide a center hole at each end, which may be utilized in subsequent handling of and work on the piece, for instance finish machining in a lathe.

In prior equipment for the purpose above referred to, the mass center has not always been accurately located, for the reason that the shifting movement of the chuck or support has itself introduced unbalance in the system, with consequent inaccurate indication of the mass center of the specimen, notwithstanding reduction of cradle oscillation to a minimum during the course of the test.

The primary object of the present invention is to eliminate the inaccuracy of mass center determination heretofore encountered.

Briefly described, according to the present invention, the above primary object is attained by providing a counterweight for the support used to mount the specimen in the machine, which counterweight is also shiftable in a direction transverse the axis of rotation, control mechanism being included providing for concurrent shift of the specimen support and of the counterweight in opposite directions transversely of the rotational axis.

A further object of the invention is to provide an improved control system incorporating mechanisms for interlocking the operation of various devices, so as to simplify the making of tests.

How the foregoing and other objects and advantages are attained will appear more fully from the following description referring to the accompanying drawings in which—

Figure 1 is an outline side elevational view of a mass centering machine incorporating the improvements of the present invention;

Figure 2 is a top plan view, on an enlarged scale, of certain parts of the machine shown in Figure 1;

Figure 3 is a vertical sectional view, on a still further enlarged scale, illustrating the mechanism employed in association with one end of a specimen to be tested in the machine of Figures 1 and 2;

Figure 4 is a fragmentary sectional view taken as indicated by the line 4—4 on Figure 3;

Figure 5 is a view taken as indicated by the line 5—5 on Figure 3;

Figure 6 is a view taken as indicated by the line 6—6 on Figure 5; and

Figure 7 is a wiring diagram of control circuits associated with various of the control devices incorporated in the machine.

Referring first to Figure 1, the general organization of the machine includes a supporting base B, on which are mounted various units of the machine, including the oscillatable cradle which comprises a pair of tubular members 8—8 (see also Figure 5). A plurality of transverse members 9—9 and 10—10 interconnect the tubes 8—8, certain of the transverse members being movable axially of the tubes 8—8 and of the base to provide for the handling of specimens of different length, such adjustment being accomplished in a manner well understood in this art. The cradle is supported on the base B by means of upright supports generally indicated at 11—11. These supports incorporate spring members providing freedom for transverse oscillation of the cradle in a manner known in this art and therefore not requiring description herein. In equipment of this general type it is also known to provide selectively engageable pivots toward opposite ends of the cradle, such pivots appearing in Figure 1 at 12 and 13. These pivots are alternatively engageable by shifting the control handle 14.

A piece or specimen to be tested is diagrammatically indicated at S in Figure 1. Such a specimen may be temporarily raised to and held in approximate operative position by means of a jack indicated at 15. The ends of the specimen are adapted to be received in jaw members 16 of chucks which are mounted in the manner described more fully herebelow with particular reference to Figure 3.

Since, in most respects, the portions of the equipment arranged at each end of the specimen to be tested are identical, only one of them need be described in detail. For this purpose reference is made to Figure 3 which illustrates the mechanism associated with the left end of the specimen as viewed in Figure 1. A shaft support 17 is mounted on the cradle, for instance by attachment to one of the cross pieces 9, this support carrying bearings as indicated at 18. A bracket 19 is also connected to the support 17 and has an upright 20 adapted to carry other parts of the equipment.

The rotatable shaft 21 which is journaled within the sleeve 22 has an end plate 23 on which the support for the specimen is mounted. The support or holder comprises the chuck jaws 16, or equivalent clamping means and also a support device 24 associated with the jaws 16 and having a spherical external surface received in a complementary socket formed in the ring 25, which ring may be of multi-part construction for purposes of assembly. A key 26 serves to ensure rotation of the central part 24 with the ring 25. These parts (16, 24, 25 and 26) comprise what is in effect a support or holder for one end of the specimen S, and this support or holder is mounted for movement in a direction transversely of the axis of rotation, during the operation of the machine to locate the mass center of the specimen.

A ring 27 surrounds the member 25 and constitutes a counterweight for the specimen support. The ring 27 is also mounted for movement transversely of the axis of rotation, as by the retaining ring 28 which is secured to the plate 23 of shaft 21. It will be observed that the plate 23 provides a common supporting means for the counterweight and the test specimen holder. At three positions equally and angularly spaced from each other about the axis of the assembly, the members 25 and 27 are provided with opposed surfaces 29—30, these surfaces being oppositely inclined in a direction axially of the assembly, and each pair cooperating with a wedge-shaped element 31 having a stem 32 movable in a guiding sleeve 33 secured in the plate 23 of the shafting 21.

Examination of Figures 3 and 4 will show that reciprocating movement of any one of the stems 32 and thus of the wedge 31 will cause the members 25 and 27 to move transversely of the axis of rotation in opposite directions. Preferably the inclination of the surfaces 29 and 30 are not only opposite but are equal and opposite, and in this event the weight of the counterweight 27 is desirably equal to that of the support for the specimen, i. e., equal to the weight of the chuck parts taken together with the ring 25. With this equality as to weight of parts and as to inclination of surfaces 29 and 30, the movement of the support and of the counterweight is equal and opposite and will have equal and opposite effects upon the balance of the system.

With three pairs of surfaces 29 and 30, with their cooperating wedges 31 equi-spaced about the axis of rotation, the movement of the support and counterweight may be effected in any radial plane.

The mechanism of the invention includes control means for selectively effecting movement of the support and counterweight in any desired radial plane. This control means comprises a swash member or plate 34 universally tiltable on the spherical member 35 which is keyed to the shaft 21 as indicated at 36. The several stems 32 projecting from the wedges 31 are associated with the swash plate 34 near the periphery thereof, each stem projecting through an oversized aperture in the plate, to accommodate relative angling of the parts. At the outermost end of each stem 32 a nut 37 is provided, and the stem also carries an abutment 38 between which and the plate 34 spring 39 is positioned, whereby to retain the stems 32 in approximately given relative relation to the plate 34. With the arrangement described, it will be seen that the swash plate 34 will rotate with the end plate 23 and thus with shaft 21.

Adjacent its periphery the swash plate 34 is grooved as indicated at 40—40 to cooperate with pins projecting from the yoke 41, which yoke is attached, by pivoted linkage 42 to a member 43 which may take the form of a disc secured to the sleeve 22 above mentioned, which sleeve is interposed between the shaft 21 and the bearing supports 18. A counterweight 44 is provided diametrically opposite the parts 41 and 42, so as to neutralize unbalance which would otherwise be introduced into the system by the single connection 41—42 extended to the swash plate 34.

Sleeve 22 is adapted to be axially shifted, to thereby tilt the swash plate 34, by means of a grooved collar 45 secured to the sleeve and cooperating with the prongs 46 of a fork member 47, which fork member is pivoted at 48. Fork 47 may be shifted by means of the actuating arm 49 which is associated with a traveling nut 50 in engagement with the screw thread 51 provided on the shaft 52 of a reversible motor 53.

The sleeve 22 and thus the connection 41—42 with the swash plate 34 is adapted to be rotated with the inner shaft 21 (to which the specimen S is connected) by means of a pair of clutch members 54 and 55, the first of which is keyed to the sleeve 22 and the second to the shaft 21. Between these members a disengageable clutch element 56 is provided, this element being rotative with clutch member 55, but being urged against the friction pad 57 on clutch member 54 by means of four angularly spaced springs 58 (see also Figure 5). Thus, the clutch members 54 and 55 are normally interconnected and the sleeve 22 thus normally rotates with shaft 21. It is here noted that the keying of the clutch member 54 to the sleeve 22 permits axial movement of the sleeve 22 independently of clutch member 54, upon operation of the shifter fork 47. The clutch members 54 and 55 are retained as against axial shifting movement by means of an annular interengaging member 59.

The member 56 is disengageable by means of a series of electromagnets indicated at 60. It may here be noted that a clutch assembly of this general type is disclosed in Patent No. 2,046,294, issued June 30, 1936. Said patent also fully illustrates and describes a roller mechanism by means of which two clutch members (such as indicated at 54 and 55) may be relatively rotated or shifted to advance or retard one with respect to the other, even while the entire assembly is in rotation. The details of this arrangement need not be considered herein, but briefly the mechanism provided for this purpose (see Figures 3, 5 and 6) includes a rocking frame composed of frame elements 61—61 pivoted at 62—62, the frame having depending actuating arms 63—63 carrying an armature 64 disposed between opposed pairs of electromagnets 65 and 66. The frame 61—61 carries two pairs of interconnected friction rollers 67—68 and 69—70. The rollers of each pair are of different diameters and are adapted to cooperate with friction surfaces 71, 72 and 73, also of different diameters, the first surface (71) being formed on clutch member 55, and the other two on clutch member 54. Rocking of the frame 61—61 brings one or the other of the pairs of rollers to operative relation with friction surfaces on the clutch members 54 and 55 and thereby causes the sleeve 22 either to advance or to retard with reference to the shaft 21, because of the differences in diameters of the friction surfaces. The electromagnets 60 (for releasing the clutch part 56) and the electromagnets 65 and 66 (for operating the rollers) are adapted to be concurrently operated as will later be described with reference to the control circuits of Figure 7.

The clutch assembly described just above is provided for the purpose of controllably varying the position of the connection 41—42 which is extended to the swash plate 34, and this in turn provides for shifting of the specimen S in any radial direction during its rotation, so as to locate its mass center.

The parts described above with particular reference to Figure 3, some also being disclosed in Figures 5 and 6, comprise an assembly which is duplicated at each end of the cradle of the machine. In use of the machine, the preferred technique is first to fix one of the cradle pivots (12 or 13) and then test the opposite end of the specimen S; and thereafter fix the other cradle pivot and test the other end of the specimen. It is here further noted that at the right hand side of the machine as viewed in Figure 1, shaft 21a (corresponding to shaft 21 of Figure 3) is coupled as by connection 74 with drive mechanism mounted and housed in the standard generally indicated at 75 in Figure 1. This drive serves to rotate the entire system, including the parts at the left end when viewed as in Figure 1, during the testing operations, the parts at the left end being driven through the specimen itself.

Attention is now called to the fact that a shaft 76 is arranged internally of shaft 21 (see Figure 3), this shaft having a chuck 77 at its inner end adapted to mount a drill 78. Shaft 76 is both rotatable and axially shiftable within the assembly and when the mass center of the specimen S has been located, the shaft is advanced and rotated, so as to drill a center hole in the end of the piece being tested. The advance and rotation of the shaft 76 is effected by means of a clutch dog 79 with which a cooperating dog 80 is engageable, the dog 80 being mounted on an axially movable and rotatable shaft 81 projecting from the drill operating unit generally indicated in Figure 1 at 82. A similar drill operating unit 83 is indicated in Figure 1 toward the right hand end of the machine, this unit serving to operate the shaft 81a carrying the clutch dog 80a which is adapted to mesh with dog 79a on the shaft 76a. In this way a center hole may be drilled in the right hand end of the specimen S when its mass center has been located.

The control system preferably utilized in association with the equipment already described is illustrated in Figure 7. Before considerig Figure 7, however, attention is called to certain control devices which are associated with the equipment and also with the controlling circuits. Thus, in Figure 2, left hand and right hand pick-up units 84 and 85 are arranged adjacent to the cradle, toward opposite ends thereof, and have projecting operating fingers 86 and 87 responsive to oscillation of the cradle at the respective ends thereof, to thereby actuate certain of the control circuits, as below described.

As seen in Figure 3 make-and-break contacts 88 and 89 are arranged to be operated by a cam finger 90 carried by the disc part 43 which is associated with sleeve 22. This also actuates certain of the control devices described below in connection with the diagram of Figure 7, it being here noted that this contact device is arranged diametrically opposite to the linkage 41—42 between the parts 34 and 43.

Toward the left of Figure 3 a thrust ring 91, supported by standard 20, cooperates with shaft 21 so as to position the shaft axially of the assembly. This thrust ring also carries a spring contact 92, by means of an insulating strap 93. Spring contact 92 is adapted to be associated with the control circuits and bears against a collector ring 94, the ring being connected with the clutch release magnets 60.

Still other control devices which are associated with the machine include a sparking dial indicated at 95 in Figure 1, this dial having a pointer 96 associated therewith which is driven by gearing within the standard 75, in a 1:1 ratio with rotation of the shaft or other piece being tested. The standard 75 also mounts an ammeter indicated at 97. A master control switch for switching the operation of various of the control circuits from one end of the machine to the other is shown in Figure 1 at 98, this switch being linked to the control lever 14 by which the pivots 12 and 13 are operated.

A pair of make-and-break contact devices are also employed, one such device being shown toward the left and bottom of Figure 5. A device of this kind is arranged toward each end of the machine and each one includes a support 99 mounted on the base of the machine independently of the oscillatable cradle, the support having a contact 100 adapted to cooperate with contact 101 which is mounted on a lever 102 pivoted at 103 to the cross member 9 of the cradle and fulcrumed as indicated at 104. For the purpose of regulating the spacing of the contacts 100—101, the fulcrum is adjustable by adjustment means including the pulley 105. A spring 106 normally urges lever 102 toward the support so as to retain the fulcrum parts in engagement with each other.

Attention is now directed to the arrangement and operation of the control devices and circuits as illustrated in the diagram of Figure 7. First note that most of the control units are identified by reference characters in Figure 7 conforming with those employed in the remaining figures. Note further that many of the control devices are duplicated in Figure 7, those appearing toward the left of the figure being those located toward the left end of the oscillatable cradle when viewed as in Figure 1, and the duplicate devices appearing in the mid portion of Figure 7 being those which are associated with the right hand end of the oscillatable cradle when viewed as in Figure 1.

In addition to the devices which appear both in Figure 7 and in the other figures, Figure 7 also discloses certain switch and other elements incorporated in the system. Thus, the block 107 represents a suitable source of current for operating certain of the devices, for instance a battery. The line 108 represents a suitable source of current for operating certain motors, for instance the usual 110 volt 60 cycle A. C. supply line.

A transformer or spark coil 109 receives current from the source 107 and is adapted to step up the voltage sufficiently to provide for sparking on the dial 95. The dial 95 comprises an annular contact element with which rotative pointer 96 is associated, the end of the pointer being spaced from the annular contact. When certain of the control devices are operated as described below, the current from source 107 energizes the sparking coil which thereupon delivers the high voltage sparking current to the device 95. Thus, in Figure 7 the left hand pair of contacts 88—89 are shown as being in engagement with each other under the influence of the actuating cam 90. Engagement of contacts 88—89 completes a circuit through the master or control switch 98 to energize the spark coil whenever the control switch 110 is closed by the operator. With the parts in the positions illustrated in Figure 7, if the operator retains the switch 110 closed, a spark will occur on the dial 95 each time the cam 90 actuates the contacts 88—89 to complete the circuit. Since both the cam 90 and the pointer 96 are driven in a 1:1 ratio with rotation of the piece being tested, the spark will occur at the same circumferential position on the dial 95 with each revolution. Advantageously, the dial 95 is graduated, for instance in degree marks ranging from 0 to 360°, so that the operator may readily note the position at which the spark occurs upon closure of the switch 110.

A similar effect will be obtained from the interengagement of contacts 88—89 of the mechanism located at the right hand end of the carriage, provided the master control switch 98 is shifted to its position opposite to that shown in Figure 7. Here it should be noted that the switch 98 is actuated by operation of the control lever 14 for alternatively engaging and releasing the two cradle pivots 12 and 13. Thus with the control lever 14 in the position illustrated in Figure 1, the switch 98 occupies the position illustrated in Figure 7. (It will be observed that the pivot devices 12 and 13 are also diagrammatically indicated toward the top of Figure 7, the pivot 12 being at this time released and the pivot 13 engaged). When the control lever 14 is shifted to the opposite position, the series of ganged switch elements incorporated in the switch 98 are shifted upwardly. In consequence the right hand contact device 88—89 is rendered operative and the corresponding left hand device is taken out of the circuit; and in addition various of the other right hand control devices are also activated and the left hand ones rendered inactive.

To further consider the operation of the control system, it is now again assumed that the switch 98 occupies the position shown in Figure 7, and attention is called to the fact that at this time the left hand contact device 99 is placed in operation. The operating circuit for this device includes a second switch 111. After first noting the position at which the spark occurs on dial 95 upon operation of switch 110, the operator may then close switch 111. Assuming that the piece being tested is out of balance, the resulting oscillation of the cradle will actuate the contacts of the left hand device 99 and this will also energize the spark coil 109 so as to produce a spark with each cycle of oscillation of the cradle. The operator will, of course, note the position on the dial 95 at which this spark occurs; and it is by comparison of the positions of the two sparks referred to (one produced by contacts 88—89 and the other by the device 99) that the phase angle of the out of balance is determined or located.

It should here be noted that the circumferential position of the spark produced by the contact 88—89 may be shifted around the dial 95 by advancing or retarding the member 43 (see Figure 3) with relation to the shaft 21, and thus also with relation to the work piece S. As hereinbefore described, the relative rotation of member 43 and of shaft 21 is effected by the clutch parts 54—55 and the control magnets 65—66 which operate the pairs of rollers 67—68 and 69—70. This adjustment of the rotative position of member 43 with relation to shaft 21 not only adjusts the angular position of the closing of contacts 88—89 but also adjusts the angular position of the linkage 41—42 with respect to the swash plate 34. Since the linkage 41—42 and the finger 90 are located diametrically opposite to each other (i. e., 180° apart), if the two points of sparking on the dial 95 (spark from contacts 88—89 and spark from device 99) are located 180° out of phase, the linkage 41—42 is properly positioned about the swash plate 34 to provide for shifting of the support 24 and the end of the work piece carried thereby in the direction required to bring the mass center of the work piece to a position along the axis of rotation.

As will be understood, ordinarily upon initial testing of one end of the piece being tested the two sparks above referred to will not occur 180° apart and adjustment of the mechanism will be needed so as to bring the closing point of contacts 88—89 to the position where the closing will set up a spark 180° out of phase with the spark set up by the device 99. This is accomplished by operation of one or the other of the push buttons A and R, providing respectively for advancing and retarding of the position of closing of contacts 88—89 with relation to the test piece. In Figure 7 the button R is illustrated as being operated for this purpose, thereby energizing the magnetic control devices 66 and concurrently also the device 60, to thereby release the clutch element 56 and cause the clutch member 54 to be driven at a lower rate than the clutch member 55, which latter is connected to rotate with the test piece. The push button A will similarly operate the controls so as to effect higher speed rotation of clutch member 54 than clutch member 55. Thus the operator may cause the linkage 41—42 and the closing point of contacts 88—89 either to advance or retard with relation to the rotation of the work piece, and these push buttons are operated until the spark from the contacts 88—89 is brought to a position 180° out of phase with the spark produced by the contact device 99.

It is here noted that the contact device 99 may be adjusted by the manual adjustment devices shown in Figure 7 at 105a, to thereby regulate the interval during which the contacts 100—101 remain closed during each cycle of oscillation of the cradle. With proper adjustment of the device 99, the operator will be given a rough indication of the magnitude of unbalance in the test piece, because of variations in breadth or intensity of the spark produced on the dial 95 by the contacts 100—101.

With the adjustments properly made to bring the two sparks above referred to diametrically opposite to each other on the dial 95, the operator may now operate the left hand motor 53 (see Figures 3 and 7) in one direction or the other, according to the direction of tilt of the swash plate 34 required to correct for the unbalance present in the piece being tested.

As will be seen from Figure 7, each of the motors 53 is provided with operating circuits arranged to effect either direction of operation of the motor, reversing control switches being shown at 112. In addition, a push button control 113 is included in the motor circuits so as to permit a fine degree of adjustment.

Appropriate operation of motor 53 will bring about transverse shift in the position of the support 24 for the work piece; and when the spark originating from contact device 99 is at a minimum the operator will know that the mass center of the left end of the test piece has been located, at least approximately.

For certain purposes the accuracy obtainable by relying merely upon observation of the intensity and breadth of the spark produced by the device 99 may be sufficient. For most purposes, however, it is contemplated that greater accuracy is needed, and for this purpose the pick-up devices 84—85 have been provided. These devices are alternatively placed in operation by a switch 98a (see Figure 7) which, as indicated by the dash line x, is ganged with the remainder of the switch elements incorporated in switch 98. With the switch 98 in the position shown in Figure 7, the pick-up device 84 which is arranged at the left end of the cradle (see Figure 2) is placed in operation and the right hand pick-up device 85 is rendered inoperative. Pick-up devices of the character here employed are known per se and therefore need not be described in detail herein. These devices, however, are adapted to be associated with a commutator or rectifier somewhat diagrammatically indicated at 114, connections being extended from the rectifier to an amplifier 114a. The output of the amplifier is delivered to the microammeter 97 (see also Figure 1). Since the circuits and devices associated with the pick-up units are not per se a part of the present invention, they are only diagrammatically shown herein. The degree of gain or amplification in the unit 114a is preferably regulable as by the switch device 115. This arrangement is advantageously utilized for securing a high degree of accuracy in adjusting the position of the test piece for locating its mass center.

After the phase of unbalance has been determined and after proper adjustment has been made to compensate for the magnitude of unbalance, the drill 78 (see Figure 3) is preferably operated so as to drill a center hole in the test piece.

It will be understood that in the testing of a piece the operations described above will first be performed on one end of the piece, i. e., with the mechanism at one end of the machine; and thereafter similar operations will be repeated utilizing the contact and control devices provided at the other end of the machine.

According to the foregoing a machine is provided for locating the mass center of a piece, the machine being highly accurate in operation and easily manipulated throughout the testing operations. The equipment of the invention is not only capable of high accuracy in location of the phase angle and magnitude of unbalance but is also characterized by counterbalancing of the supports for the piece being tested, so that errors are not introduced into the system when the piece is shifted to locate its mass center.

We claim:

1. In a mass centering machine, a drive shaft, a support connected with and rotated by the drive shaft, a test specimen holder and a counterweight each slidably mounted on the support and adapted to rotate therewith, and means operable while said support is rotating for concurrently sliding the holder and the counterweight in diametrically opposite directions relative to the axis of rotation of the support.

2. A construction in accordance with claim 1 wherein said means includes a tiltable swash member, a spherical member interconnecting the swash member and the shaft and providing for tilting of the swash member relative to the shaft, and mechanism for converting the tilting movements of the swash member into sliding movements of the holder and counterweight.

3. A construction in accordance with claim 2 further including a control device for tilting the swash member during rotation comprising a rotatable control element movable in a direction generally parallel to the axis of rotation of the support and slip connections between the swash member and the control element.

4. A construction in accordance with claim 3 wherein said control device further includes mechanism for changing the angular velocities of the rotatable control element and the swash member relative to one another.

5. In a mass centering machine, a test specimen holder mounted for rotation and for movement in a direction transversely of its axis of rotation, a counterweight surrounding the holder mounted for synchronous rotation therewith and for movement transversely of said axis, a support common to the holder and the counterweight and synchronously rotatable therewith, the counterweight and the holder having surfaces presented toward each other, which surfaces are inclined in opposite directions axially of the rotational axis, and a wedge-shaped element interposed between said surfaces and movable axially of the rotational axis to effect shifting movement of the holder and counterweight in opposite directions.

6. A construction in accordance with claim 5 in which the holder and counterweight have three pairs of said opposed inclined surfaces angularly offset from each other about the axis of rotation, with a wedge-shaped element between each pair, the construction further including a tiltable swash member connected with said elements and providing for shifting of the holder and counterweight.

7. A construction in accordance with claim 6 and further including control mechanism for effecting the shifting movement of the holder and counterweight in any axial plane including a control element movable axially of the axis of rotation of said support and slip connections between the control element and the swash member.

8. A construction in accordance with claim 7 and further including a control mechanism for varying the extent of said shifting movement of the holder and the counterweight including means to axially move said control element.

9. In a mass centering machine: a drive shaft; a disk-like support integrally connected with one end of said shaft; a test specimen holder mounted on the support and a ring-like counterweight for the holder also mounted on the support surrounding the counterweight, the holder and the counterweight each having three surfaces respectively presented to one another to form three pairs of such surfaces, the surfaces of each pair being respectively inclined in opposite directions axially of the axis of rotation of the support and the pairs being equally spaced about the axis of rotation of the support; a wedge-shaped element interposed between each pair of said surfaces; a spherical member secured to said shaft; a disk-like tiltable swash plate mounted on said spherical member; three actuating members connected with the swash plate and extending through the support and respectively connected with said wedge-shaped elements; and means for tilting the swash plate including a rotatable control element movable axially of the drive shaft and slip connections between the swash plate and said rotatable control element.

10. In a mass centering machine having an oscillatable cradle, a rotatable shaft carried by the cradle, a specimen holder mounted on the shaft and rotatable therewith and shiftable transversely of the axis of rotation of the shaft, a counterweight also mounted on the shaft and rotatable therewith and shiftable transversely of the axis of rotation of the shaft, and controllable mechanism operable during rotation of the shaft, the holder and the counterweight for shifting the holder and the counterweight, the shifting of the counterweight being 180° out of phase with the shifting of the support.

11. A construction in accordance with claim 10 in which the holder and counterweight are of substantially equal weight and the extent of shifting thereof substantially equal.

References Cited in the file of this patent

UNITED STATES PATENTS

| Number | Name | Date |
|---|---|---|
| 1,398,333 | Lundgren | Nov. 29, 1921 |
| 2,087,653 | Olsen | July 20, 1937 |
| 2,088,553 | Olsen | July 27, 1937 |
| 2,140,398 | Buckingham | Dec. 13, 1938 |
| 2,160,314 | Ongaro | May 30, 1929 |
| 2,219,795 | Van Degrift | Oct. 29, 1940 |
| 2,315,998 | Haeger | Apr. 6, 1943 |
| 2,449,429 | Van Degrift et al. | Sept. 14, 1948 |

FOREIGN PATENTS

| Number | Country | Date |
|---|---|---|
| 590,759 | Germany | Jan. 12, 1934 |